US006199301B1

(12) United States Patent
Wallace

(10) Patent No.: US 6,199,301 B1
(45) Date of Patent: Mar. 13, 2001

(54) COATING THICKNESS CONTROL

(75) Inventor: Glen Wallace, Mount Colah (AU)

(73) Assignee: Industrial Automation Services Pty. Ltd., Teralba (AU)

( * ) Notice: Subject to any disclaimer, the term of this patent is extended or adjusted under 35 U.S.C. 154(b) by 0 days.

(21) Appl. No.: 09/341,818

(22) PCT Filed: Jan. 22, 1998

(86) PCT No.: PCT/AU98/00030

§ 371 Date: Sep. 10, 1999

§ 102(e) Date: Sep. 10, 1999

(87) PCT Pub. No.: WO98/32890

PCT Pub. Date: Jul. 30, 1998

(30) Foreign Application Priority Data

Jan. 22, 1997 (AU) ................................................ PO 4732

(51) Int. Cl.[7] ................................................ G01D 21/00

(52) U.S. Cl. ................................ 34/623; 34/629; 34/631; 34/639; 34/655

(58) Field of Search ............................ 34/524, 560, 561, 34/565, 573, 618, 619, 623, 629, 631, 638, 639, 655, 652, 653

(56) References Cited

U.S. PATENT DOCUMENTS

| | | | | |
|---|---|---|---|---|
| 2,568,492 | | 9/1951 | Gallick | 299/149 |
| 3,272,176 | | 9/1966 | Saydlowski | 118/63 |
| 3,753,418 | * | 8/1973 | Roncan | 118/63 |
| 3,917,888 | * | 11/1975 | Beam et al. | 427/433 |
| 4,041,895 | * | 8/1977 | Overton et al. | 118/7 |
| 4,106,429 | * | 8/1978 | Phillips | 118/63 |
| 4,359,964 | * | 11/1982 | Johnson | 118/63 |
| 4,697,542 | * | 10/1987 | Kohler et al. | 118/63 |
| 5,221,345 | * | 6/1993 | Blankenship et al. | 118/63 |
| 5,279,667 | * | 1/1994 | Blankenship et al. | 118/63 |
| 5,665,160 | * | 9/1997 | Davene et al. | 118/63 |

FOREIGN PATENT DOCUMENTS

| | | |
|---|---|---|
| 37005/93 | 10/1993 | (AU) . |
| 4024229 C1 | 7/1991 | (DE) . |
| 0 249 234 A1 | 12/1987 | (EP) . |
| 2019916 | 11/1979 | (GB) . |
| 2254808 | 10/1992 | (GB) . |

* cited by examiner

*Primary Examiner*—Pamela Wilson
(74) *Attorney, Agent, or Firm*—Lahive & Cockfield, LLP

(57) ABSTRACT

An air knife mouth arrangement for use in an air knife assembly having a laterally extending mouth through which pressurized fluid passes to operate on a coating applied to a surface of a sheet material passing the mouth in a longitudinal direction to control the thickness of the coating. In the preferred form of the invention shown the air knife mouth arrangement comprises a mouth defined by a pair of facing lips, each lip having in front elevation a curved shape along its length. The curved shapes of the two lips face each other. The lips of the air knife mouth arrangement are selectively laterally displaceable relative to each other by a moving means so as to thereby vary the separation of the lips and hence the width of the mouth along the length of the mouth. It is to be noted that the term "length" refers to the dimension of the mouth in the lateral direction (indicated by the X axis), while the term "width" refers to the dimension of the mouth in the longitudinal direction (indicated by the Y axis).

15 Claims, 6 Drawing Sheets

COATING THICKNESS CONTROL

FIELD OF THE INVENTION

This invention relates to the control of thickness of a coating applied to the surface of a sheet material.

BACKGROUND TO THE INVENTION

The accurate and continuous control of the thickness of a coating being applied to the surface of a sheet material is required in a number of industries. For example, it is often necessary to control the thickness of coatings applied to paper or other similar materials in the form of a continuous travelling web. Another field in which the control of thickness of a continuously applied coating is required is in hot dip galvanising of metal sheet. The present invention has been particularly developed for controlling the coating thickness in a hot dip galvanising operation and it will be convenient to particularly describe the invention in relation to this field of application. However it should be appreciated that the apparatus and process of the present invention is applicable to other coatings and to other sheet materials being coated.

The hot dip galvanising process aims to apply a controlled amount of a protective coating, typically zinc and/or zinc alloy, to the surface of a metal item in order to produce a reasonable corrosion service life for the coated component. In the case of sheet metal for use in automobiles, roofing and similar applications a continuous hot dip galvanising line is employed to coat the sheet. The basic elements of such a galvanising line are depicted in FIG. 1. The galvanising line 1 includes input coils 2 which carry a roll of metal sheet 3. The metal sheet 3 is fed into an accumulator 4 and then passed through a furnace 5 (not shown). Upon leaving the furnace the metal sheet is passed through a bath of protective coating 6, such as molten zinc. The coated sheet 11 then passes between a pair of air knives 15 located on opposing sides of the sheet. Scanning X-ray gauges 47 are located down the line beyond the air knives 15 to monitor the resulting thickness of the protective coating.

For metal sheet processed upon such a line the corrosion service life of the final product is dictated by the thickness of the applied coating, and in particular by the thinnest coating at any point of the applied coating. This is reflected in the standard measures which are used to classify coated sheet, which focus upon the minimum single spot thickness in the coating. Due to such standards specifying a minimum coat requirement, the producers of galvanised sheet must ensure that at all points over the sheet the coat thickness is above the minimum required for the product in question.

The coating thickness is controlled by the application of a high pressure wiping jet which issues from an air knife adjacent to each surface of the metal sheet as the sheet is withdrawn from a molten zinc bath. A typical air knife 15 is depicted schematically in FIG. 2. The amount of coating which remains upon the surface of the sheet after passing through the wiping jet is mainly determined by the following parameters:

- line speed,
- distance from the air knife mouth to the sheet surface,
- pressure within the air knife header, and
- dimensions of the mouth.

The distance from the air knife mouth to the sheet surface is controlled by horizontal positioning of the air knife assembly and is dependent also on the profile which the sheet adopts as it passes the air knives. Referring to the horizontal section shown in FIG. 3*a*, a bowed sheet profile can occur as the sheet exits the molten zinc bath and passes the air knives. This reduces the knife mouth to sheet distance in the centre section of the upper or distal sheet surface 31 relative to the knife mouth to sheet distance in the edge regions of sheet surface 31. The reverse is true for the lower or proximal sheet surface 32. This has the effect of introducing a variation in the thickness of the coating across the sheet. FIG. 3*b* illustrates a typical coating profile on the upper or distal sheet surface 31 whilst FIG. 3*c* illustrates a typical coating profile on the lower or proximal sheet surface 32. This coating defect is known as "crossbow".

The crossbow defect in the coating profile forces line operators to increase the average amount of coating material which is applied to the sheet surfaces in order to ensure that the minimum single spot requirements are satisfied across the entire width of the sheet. Typical magnitudes of crossbow defect are of the order of 10% of the average coating being applied. As such, the over-coating required in order to avoid crossbow induced violations of minimum single spot coating requirements represents a significant cost to continuous galvanising line operators.

There have been many systems proposed or implemented for controlling the coating thickness, particularly in circumstances where bowing of the sheet material causes variations in coating thickness across the width of the sheet. Such systems have typically involved modifying the configuration or other parameters of the air knife. For example, there have been proposed systems for changing the shape of the mouth of the air knife through which the pressurised gas emerges by deforming one of the lips defining the mouth; the deformation of the lip being non-uniform along its length so that the width of the mouth opening varies at different points along its length. Constricting the width of the mouth reduces the gas flow at that point thus reducing the wiping effect at that point and thereby producing an increased coating thickness, and vice versa. Examples of such systems involving selective opening and closing of the width of the mouth are shown in the published patent specifications U.S. Pat. No. 5,423,913 and AU-37005/93.

In patent specification AU-50750/85 there is proposed a system of modifying the gas flow through the mouth of the air knife by selectively opening fluid escape passages which open into the mouth to thereby locally reduce the flow rate through the mouth.

U.S. Pat. No. 4,524,716 discloses an air knife in which movable obstructions are provided inside the mouth so as to selectively modify the fluid flow through the mouth and thereby provide different flow rates at different points across the sheet or web being coated.

All of these prior proposed systems are mechanically relatively complex since they require a multiplicity of controllable operating components provided along the length of the mouth. This can make the total air knife assembly and control system complex in construction and operation and susceptible to mechanical failure or dysfunction, and difficult expensive or time consuming to install, calibrate or repair.

Accordingly, it is an object of the present invention to provide an air knife arrangement for use in coating thickness control which overcomes or ameliorates at least one shortcoming of prior air knife arrangements, or at least provides a useful alternative to prior air knife arrangements.

Although the terms "air knife", "air knife assembly", and "air knife arrangement" are used throughout the specification and claims such terms are not to be construed as limiting the invention to a field of application in which pressurised air is used. Other gases, or even liquids, may be used and are encompassed by the invention.

DISCLOSURE OF THE INVENTION

Accordingly, the present invention provides an air knife assembly including:

- a body for mounting adjacent to a sheet material which in use is moved past the body in a longitudinal direction;
- a mouth facing the sheet material and extending laterally, the mouth being defined by a pair of facing lips, the facing lips movable relative to the body;
- means for distributing a fluid under pressure through the body to enter and emerge from the mouth whereby pressurised fluid emerging from the mouth operates on a coating applied to a surface of the sheet material passing the air knife to thereby control the thickness of the coating;
- moving means operable to move the lips relative to the air knife body;
- wherein the pair of facing lips are laterally displaceable relative to each other and are configured and adapted to co-operate with each other such that upon relative lateral displacement of the lips the separation between the lips is varied along at least part of the length of the mouth;
- the moving means being operable to laterally displace the lips relative to each other so as to vary the separation of the lips and hence the width of the mouth at different points along at least part of the length of the mouth.

The present invention also provides an air knife mouth arrangement for use in an air knife assembly having a laterally extending elongated mouth through which pressurised fluid passes to operate on a coating applied to a surface of a sheet material passing relative to the mouth in a longitudinal direction to control the thickness of the coating, the air knife mouth arrangement including a pair of facing lips defining the mouth, the facing lips adapted to be movable relative to the air knife body;

- wherein the pair of facing lips are laterally displaceable relative to each other and are configured and adapted to co-operate with each other such that upon relative lateral displacement of the lips the separation between the lips is varied along at least part of the length of the mouth.

Advantageously, by providing a mouth with a pair of facing lips which are configured and adapted to co-operate with each other, a variation in width of the mouth opening, and hence a variation in fluid flow emerging from the mouth at different points along the length of the mouth, can be achieved by a relative lateral displacement of the two lips. This enables, for example, a single linear lateral movement of one lip or simultaneous oppositely directed line in lateral movements to the two lips to achieve a change in profile of the mouth, and in particular predetermined changes in widths of the mouth at different points along the length of the mouth.

It is further advantageous that the side shifting motion of the two lips forming the mouth of the air knife can be employed to break free, and hence remove, small lumps of coating material which have deposited upon the nozzle in the liquid state and subsequently become fixed in place. Hence the relative lateral motion of the lips can assist in maintaining the nozzle in a clean state, free of obstructions, thereby reducing the need to resort to cleaning the nozzle by other means such as mechanical means which may adversely affect the quality of the coating. The ability of the relative lateral displacement of the lips to break frozen obstructions from the nozzle is further enhanced by the use of a superfine surface finish on the inside surfaces of the nozzle.

Preferably each lip of the pair of facing lips has, in front elevation, a curved shape along at least a part of its length, the curved shapes of the lips facing each other.

Preferably the curved shape of each lip is provided along substantially the entire length of the mouth such that the relative lateral displacement of the lips produces a mouth width variation over substantially the entire length of the mouth.

Preferably the shape of each lip is defined by a mathematical function which, taking the origin as the mid-point along the length of the mouth as the origin of a co-ordinate system and taking the longitudinal and lateral directions as the axes, defines a shape which is not symmetrical about either of the axes, but has anti-symmetry about the two axes.

Preferably the shape of each lip, in front elevation, is defined by an odd polynomial function or by a trigonometric function.

Preferably each lip has an identical shape to the other lip, although for some purposes or fields of application an initial non-uniform mouth width along its length may be required.

Preferably the moving means of the air knife assembly is operable to move both of the lips simultaneously in opposing directions. In this way the mid-point along the length of the mouth defined between the lips can remain substantially in the same position relative to the width of the sheet material passing the air knife.

Preferably the moving means is operative in response to signals from control means, the control means including sensing means located past the air knife and operative to sense the coating thickness achieved on the surface of the sheet material.

In a further preferred form of the present invention the moving means is operable to move the pair of facing lips fore and aft relative to the air knife body so as to alter the mean distance between the mouth and the surface of the sheet material.

Advantageously, this form of the present invention can be utilised to control the mean thickness of the coating upon the surface of the sheet material.

In a further preferred form of the present invention the moving means is operable to move the pair of facing lips forward at one end and aft at the other end relative to the air knife body.

Advantageously this aspect of the present invention can be utilised to compensate for misalignment between the mouth of the air knife and the surface of the sheet material.

In a further preferred form of the present invention the moving means is operable to laterally move a wedge member between one of the lips and the body of the air knife so as to adjust the position of the lip relative to the other lip and thus the average distance between the air knife lips along the length of the lips.

All of the mentioned modes of operation may be controlled by manual and/or automatic closed loop control by employing a downstream coating feedback measurement device.

BRIEF DESCRIPTION OF DRAWINGS

The preferred features of the present invention will now be described with particular reference to the accompanying drawings. However it is to be understood that the features illustrated in and described with reference to the drawings are not to be construed as being limiting on the scope of the invention. In the drawings.

PREFERRED EMBODIMENT OF THE INVENTION

Figure 1:
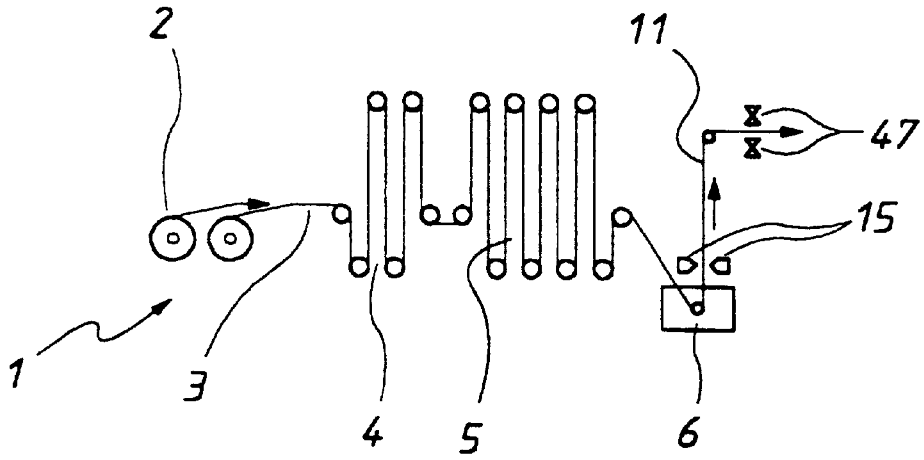
FIG. 1 is a diagrammatic view of a typical hot dip galvanising line for coating sheet metal in a continuous strip or web.
Figure 2:
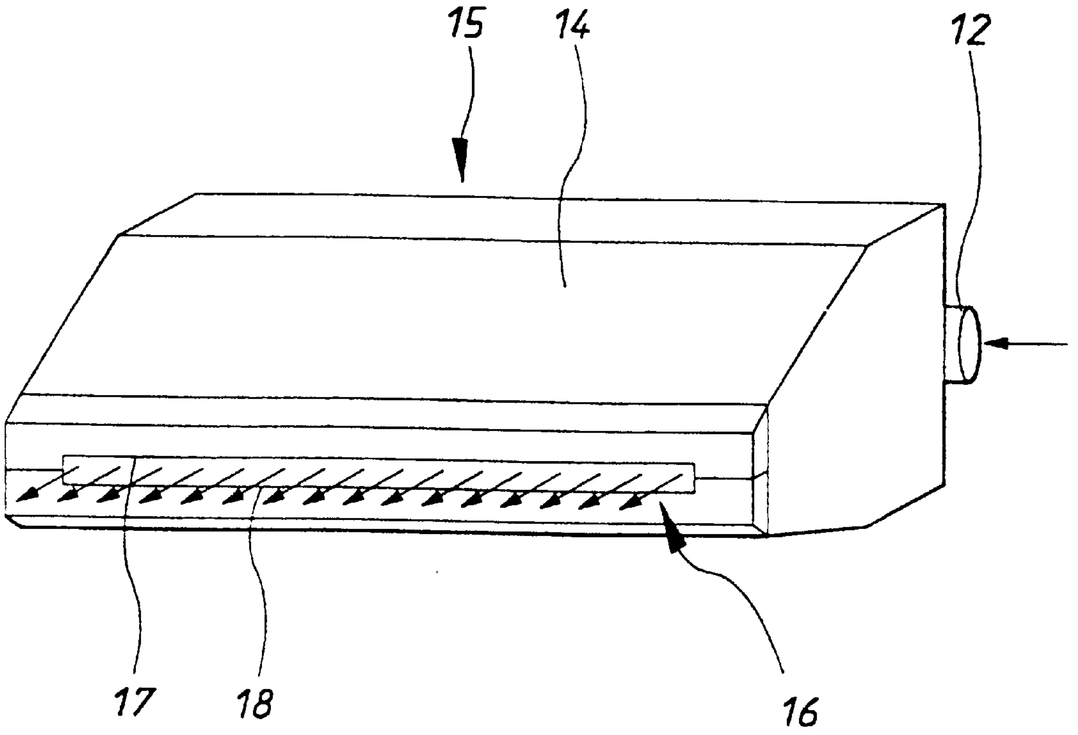
FIG. 2 is a schematic perspective view of a conventional air knife.

FIGS. 1, 2 and 3 have been referred to in the introductory part of this specification and depict a known hot dip galvanising line, air knife configuration and arrangement, and coating defects caused by bowing of the sheet metal (the crossbow defect).

Figure 4:
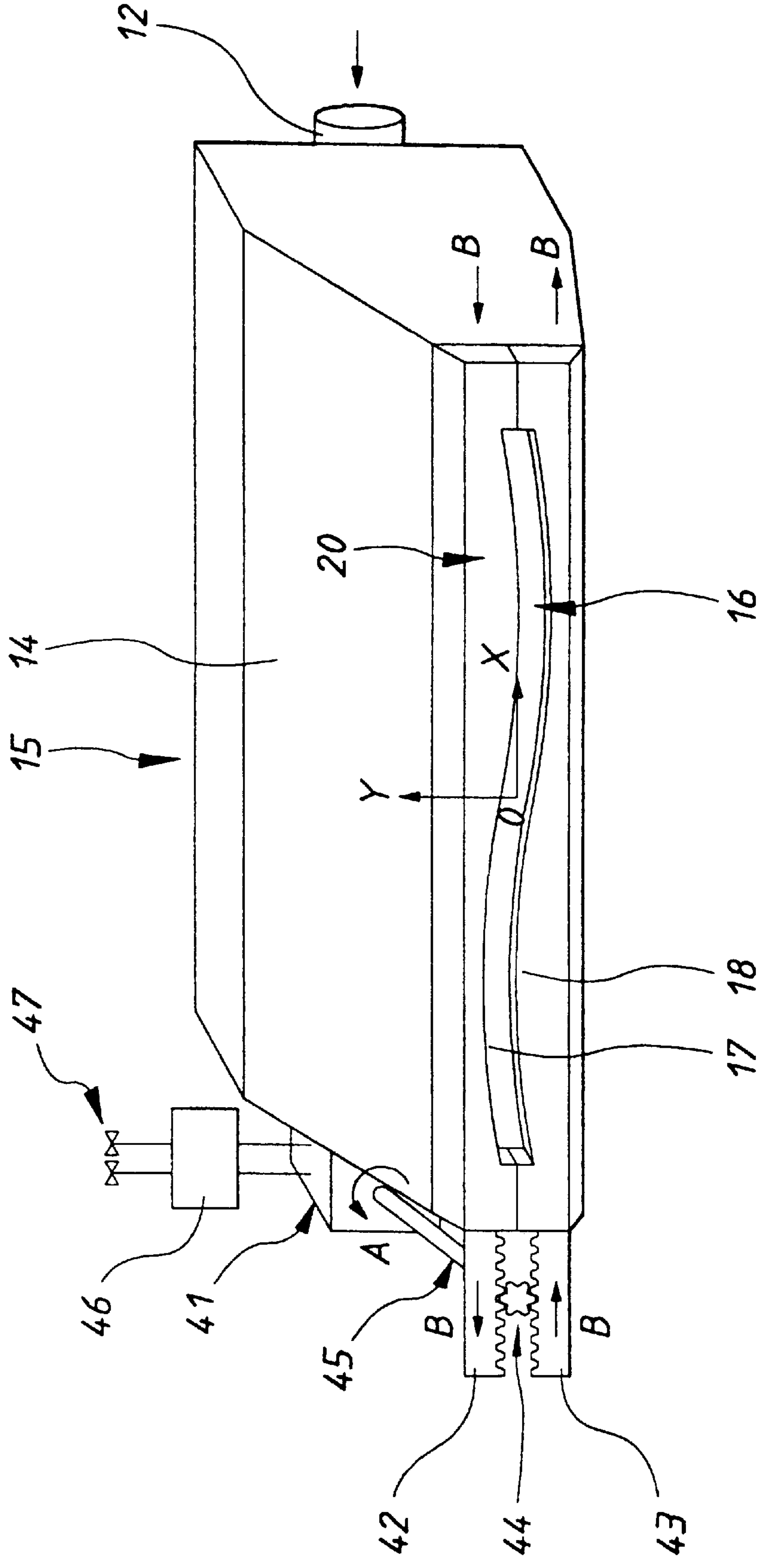
FIG. 4 is a schematic perspective view of one preferred embodiment of an air knife assembly according to the present invention.

Referring to FIG. 4, the present invention relates to an air knife mouth arrangement 20 for use in an air knife assembly 15 having a laterally extending mouth 16 through which pressurised fluid passes to operate on a coating applied to a surface of a sheet material 11 passing the mouth in a longitudinal direction to control the thickness of the coating. In the preferred form of the invention shown the air knife mouth arrangement 20 comprises a mouth 16 defined by a pair of facing lips 17, 18, each lip having in front elevation a curved shape along its length. The curved shapes of the two lips 17, 18 face each other. The lips 17, 18 of the air knife mouth arrangement are selectively laterally displaceable relative to each other by a moving means 41 so as to thereby vary the separation of the lips and hence the width of the mouth along the length of the mouth 16. It is to be noted that the term "length" refers to the dimension of the mouth in the lateral direction (indicated by the X axis), whilst the term "width" refers to the dimension of the mouth in the longitudinal direction (indicated by the Y axis).

The present invention also provides an air knife assembly 15, the assembly comprising a body 14 for mounting adjacent to the sheet material 11 which in use is moved past the body 14 in a longitudinal direction. To the body 14 is mounted the mouth arrangement 20 with the mouth 16 defined by the pair of facing lips 17, 18 of curved shape. Means 12 are provided for distributing a fluid under pressure through the body 14 to enter and emerge from the mouth 16 whereby pressurised fluid emerging from the mouth operates on a coating applied to the surface of the sheet material 11 passing the air knife to thereby control the thickness of the coating. The moving means 41 selectively laterally or sideways displaces the facing lips 17, 18 so as to thereby vary the separation of the lips and hence the width of the mouth at different points along the length of the mouth.

In the preferred embodiment for achieving a mouth width variation to counteract or compensate for crossbow defect in coating profile, the shape of each lip 17, 18 is preferably defined by a mathematical function which, taking the midpoint along the length of the lip as the origin of the co-ordinate system and taking the lateral and longitudinal directions as the X and Y axes respectively, defines a shape which is not symmetrical about either of the axes, but has anti-symmetry about the two axes. In a particularly preferred embodiment as illustrated, the shape of each lip in front elevation is defined by an odd polynomial function or by a trigonometric function.

The mathematical function defining the shape or profile of the lips 17, 18 may be an odd polynomial function or a trigonometric function such as:

$$y=Ax+Bx^3+Cx^5+Dx^7,$$

or $$y=A\sin(B\pi x)$$

where:

y=longitudinal (vertical) coordinate x=lateral (transverse) coordinate, with origin as shown in FIG. 4

A,B,C,D=tuning constants chosen appropriately to achieve desired gap variation and minimise total gap variation.

Figure 5:
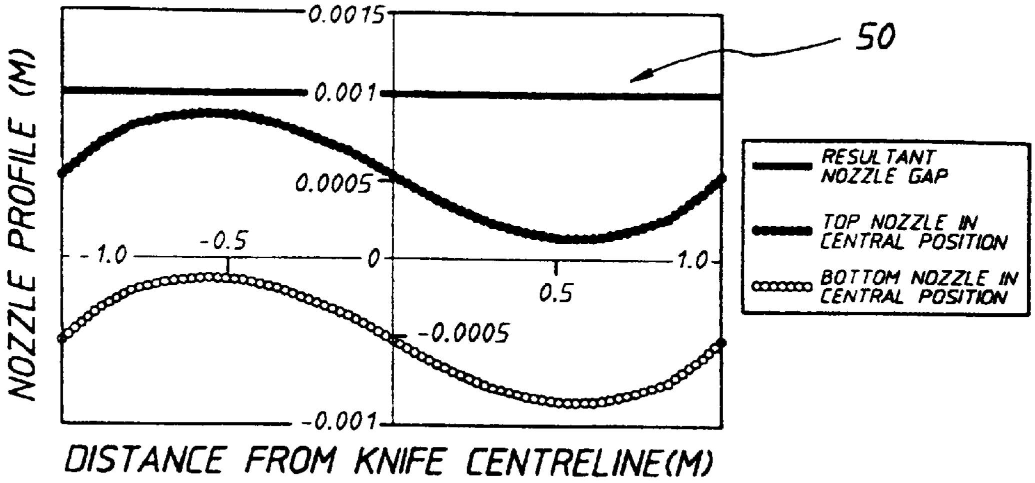
FIG. 5 graphically depicts the mouth shape and mouth width variation of a preferred embodiment of air knife according to the present invention, with the lips of the mouth in a central or neutral position.

As shown in FIG. 5, (with the scales of the axes being chosen to exaggerate the amplitude of the curvature of each lip), it is preferable that when the upper and lower lips are in a central or neutral position they define a mouth having a constant width along its entire length, as illustrated by the line 50 representing a constant width of 0.001 m. Although the shape of the mouth is not a straight line, and hence the shape of the emerging pressurised fluid does not lie in a flat plane, the wiping blade effect of the emerging pressurised fluid nevertheless is substantially uniform across the entire width of the mouth. If the surface of the sheet material passing the mouth is perfectly flat, the wiping effect and hence the achieved thickness of coating will be substantially uniform across the entire width of the sheet material.

Figure 3A:
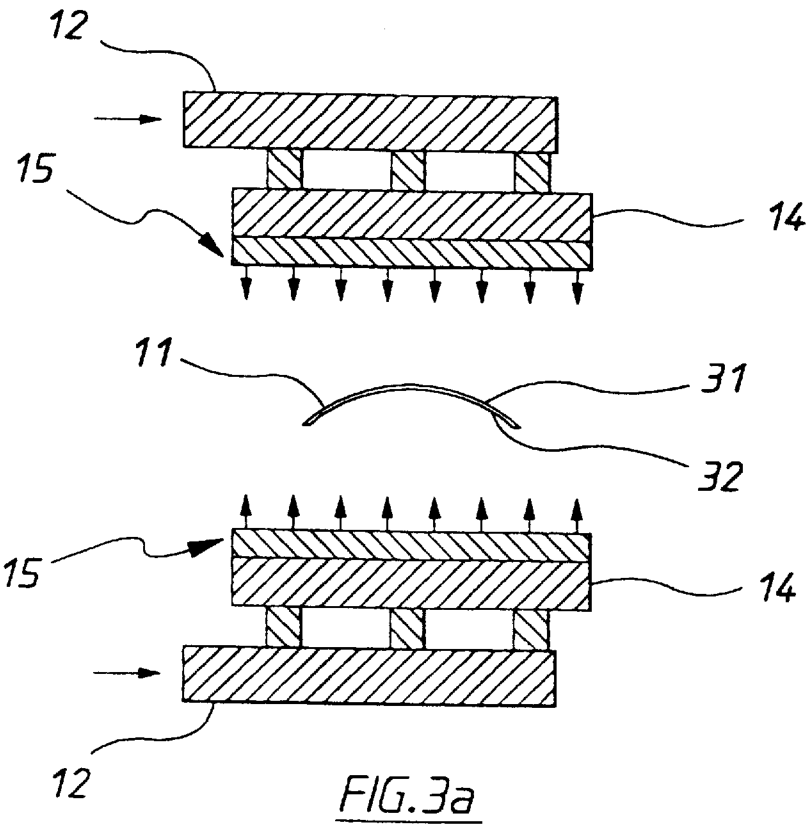
FIG. 3*a* is a horizontal sectional view of a pair of air knives operating on a bowed sheet material passing between the air knives.
Figure 3B:
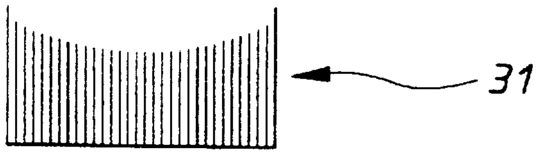
FIGS. 3*b* & 3*c* illustrate a typical profile of the coating thickness resulting from the sheet material being bowed as it passes between a pair of air knives.
Figure 3C:
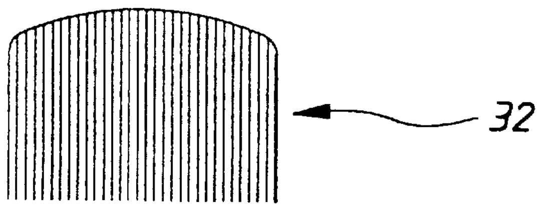
Figure 6:
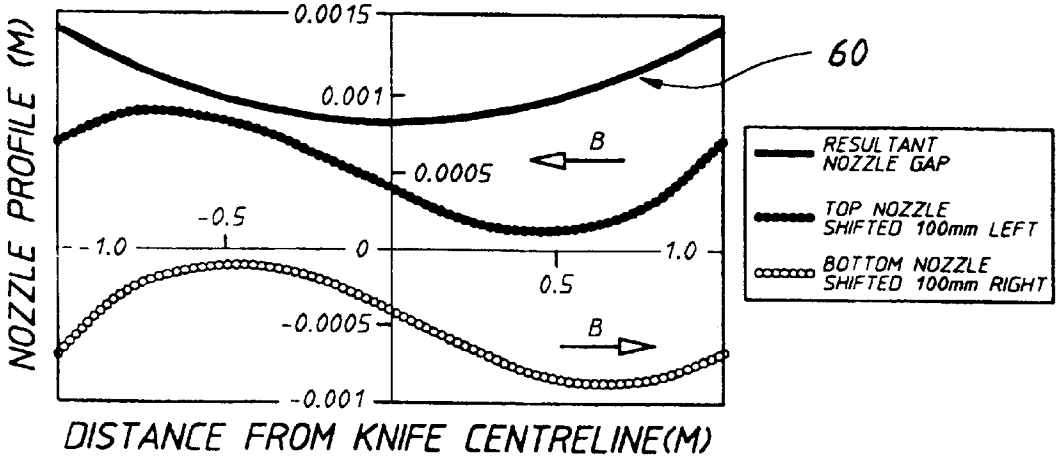
FIG. 6 graphically depicts the mouth shape and mouth width variation of a preferred embodiment of air knife according to the present invention, with the lips of the mouth in a laterally displaced first position.

However, if the sheet material is bowed as shown in FIG. 3*a*, the thickness of the coating applied to one surface will be concave in profile across the width of the sheet and convex in profile across the width on the other surface of the sheet as previously described with reference to FIGS. 3*b* & 3*c*. By sensing variations in coating thickness across the width of the sheet at a point beyond (downstream of) the air knives, a control system can be utilised to produce appropriate control signals to vary the shape of the mouth of each air knife by lateral or sideways displacement of the respective facing lips. Lateral or sideways displacement of the lips in the direction shown by the arrows B in FIG. 4 and FIG. 6 will narrow the width of the mouth midway along the length of the mouth and will likewise increase the width of the mouth at its ends. Thus over the length of the mouth, the width of the mouth opening will vary as shown by the curve 60 in FIG. 6. This will reduce the pressurised fluid flow in the centre of the mouth and increase the fluid flow at the opposite ends of the mouth thus enabling compensation for crossbow defect producing a concavity in the coating thickness across the width of the coating.

Figure 7:
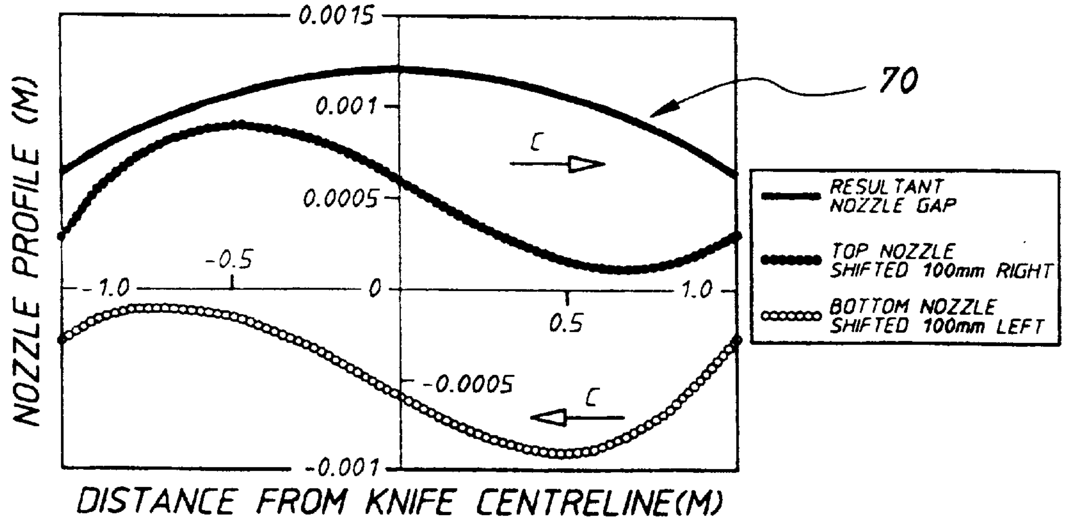
FIG. 7 graphically depicts the mouth shape and mouth width variation of a preferred embodiment of air knife according to the present invention, with the lips of the mouth in an opposite, laterally displaced second position.

Conversely, as shown in FIG. 7, lateral or sideways displacement of the upper and lower lips in the direction of arrows C produces a widening of the mouth at the mid region along its length, and narrowing of the width of the mouth at the opposite ends, as shown by the curve 70. This produces increased pressurised fluid flow in the centre with a greater wiping effect or wiping power in the central region, thus enabling compensation for crossbow defect with a convex profile of the coating thickness across the width of the sheet material.

The amplitude of the variation in width of the mouth will vary dependent on the extent of lateral or sideways displacement of the lips. Careful selection of the particular odd polynomial function or the trigonometric function and careful selection of the tuning constants in the formula defining the shape or profile of each lip will allow the particular form of the mouth width variation to closely match the typical sheet material strip or web deflection. The typical strip deflection caused by bowing of the sheet material in the vicinity of the air knives has been studied or can be studied empirically. And, as a result, the selection of the particular mathematical function and tuning constants can be estimated from such studies and/or effective lip profiles can be determined by empirical methods of testing different lip profiles.

The moving means 41 for displacing the lips laterally can be any suitable means. For example, a mechanical arrangement such as gears may be used. Alternatively a hydraulic or pneumatic actuator may be employed. The moving means 41 illustrated in FIG. 4 is operative to simultaneously move both lips in opposite lateral directions. In the embodiment depicted, the moving means comprises racks 42, 43 connected to the respective upper and lower lips 17, 18, the lips in turn being mounted to the body 14 of the air knife for lateral sliding movement. Co-operating with the racks 42, 43 is a pinion 44 on a drive shaft 45. The arrangement is such that rotation of the drive shaft 45 in the direction of arrow A produces lateral or sideways movement of the upper and lower lips in opposite directions as shown by the arrow s B. The moving means 41 may be operative in response to signals from control means 46, the control means including sensing means 47 located past the air knife and operative to sense the coating thickness achieved on the surface of the sheet material 11.

It will be seen this preferred embodiment of the air knife mouth arrangement and air knife assembly, enable the selective control of the width of the mouth at different points along the entire length of the mouth. This enables adjustment of the wiping effect in a controlled manner. The mouth arrangement can be relatively simple in construction and operation so that it can be reliable in operation. It is believed that the air knife mouth arrangement may be capable of being retrofitted to existing air knives so that the air knife mouth arrangement per se is a novel and valuable article of manufacture, as well as the total assembly with the air knife mouth arrangement installed and in use in an air knife.

Figure 8A:
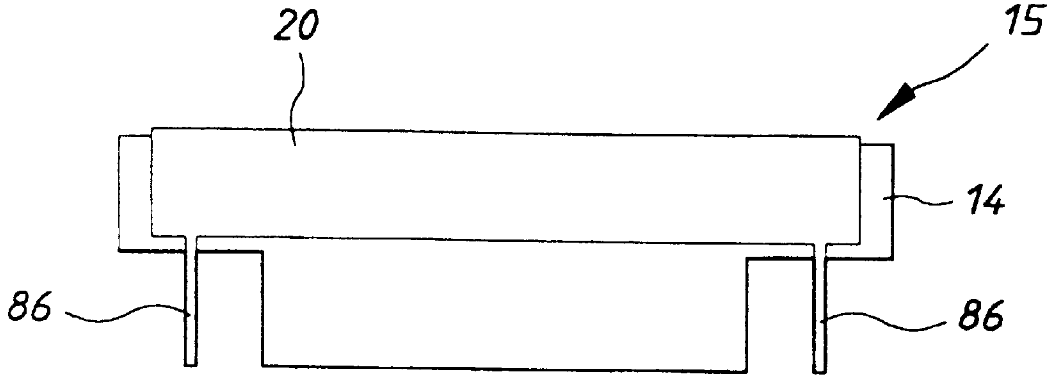
FIGS. 8*a* to 8*c* schematically depict plan views of a further preferred embodiment of air knife according to the present invention, illustrating the fore and aft movements of the air knife mouth relative to the body of the air knife.
Figure 8B:
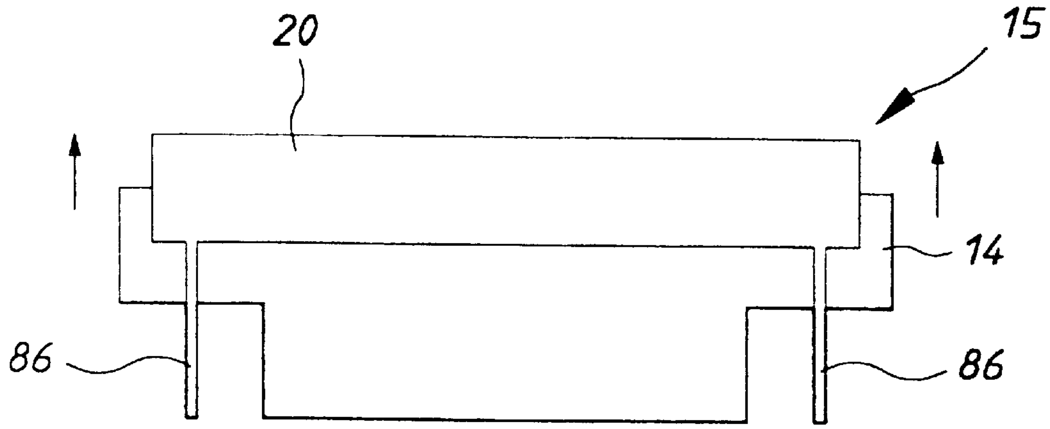
Figure 8C:
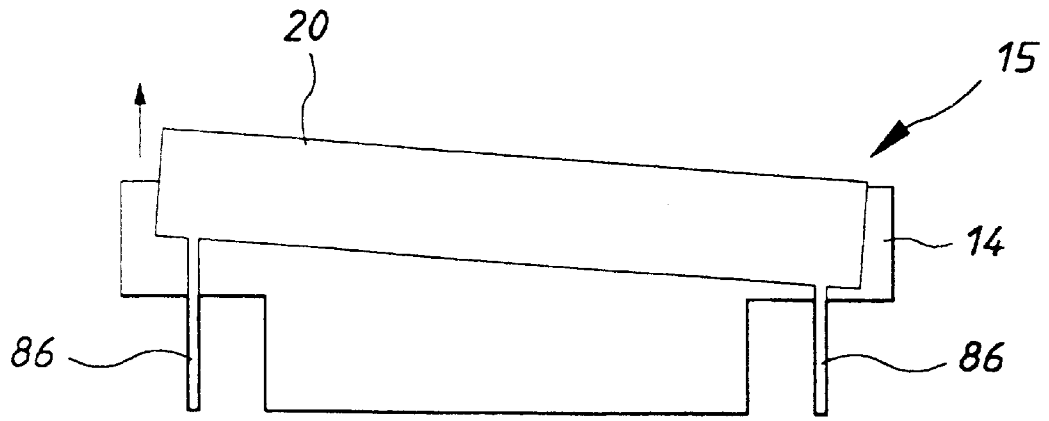

Referring to FIGS. **8*a* to 8*c*, a further preferred embodiment of the present invention provides for the adjustment of the mean distance between the mouth of the air knife and the sheet, and for adjustment of the alignment between the mouth of the air knife and the plane of the sheet. The air knife 15 is schematically depicted in plan view. At each end of the air knife mouth arrangement 20 there is provided a moving means 86 for moving the lips of the mouth in fore and aft directions with respect to the body 14 of the air knife. FIG. 8*a* depicts the air knife 15 with the lips of the air knife mouth 20 in a retracted position with respect to the air knife body 14. In FIG. 8*b* the lips of the air knife mouth have been extended from the body 14. In this way the mean distance between the mouth of the air knife and the surface of the coated sheet can be adjusted. In FIG. 8*c* the moving means 86** can by utilised to move one end of the mouth forward and the opposing end aft. In a particularly preferred arrangement the opposing ends of the mouth can be moved in equal but opposite directions so as to alter the alignment of the air knife mouth with respect to the surface of the sheet. In this way it is possible to compensate for skewing of the sheet as it passes the mouth of the air knife.

Figure 9:
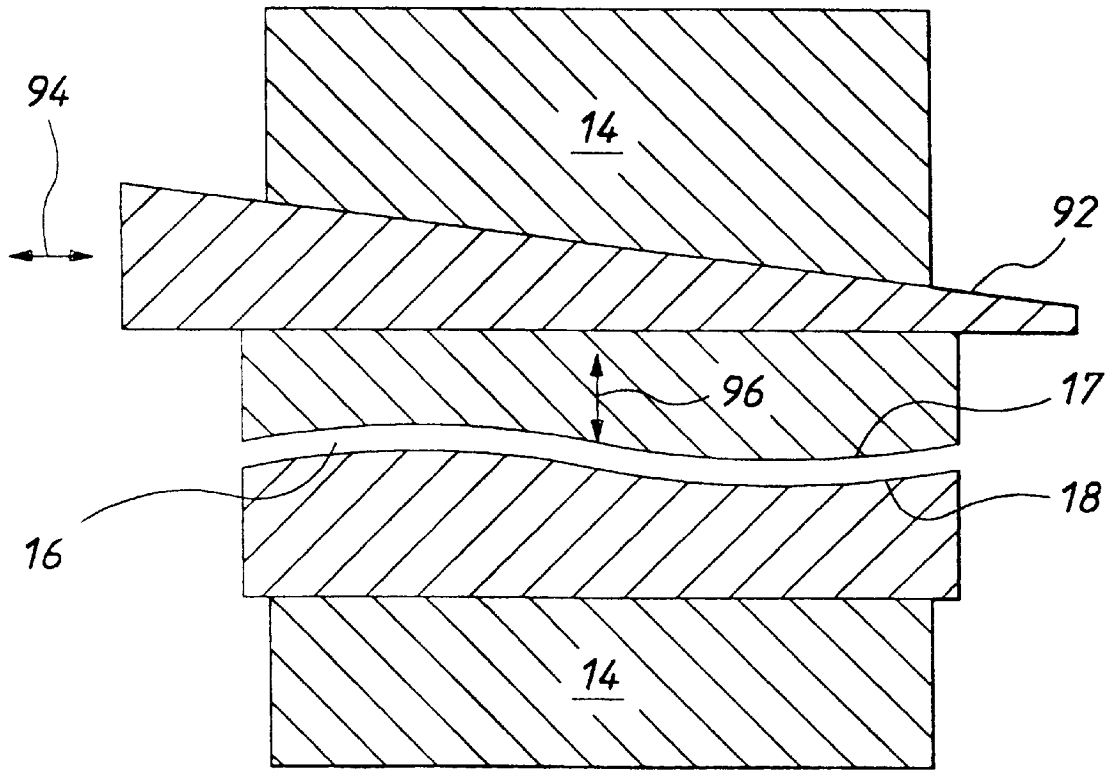
FIG. 9 schematically depicts a further preferred embodiment of air knife according to the present invention, illustrating a wedge arrangement for adjusting the mean distance between the lips of the air knife mouth.

Referring to FIG. 9, in a further preferred embodiment of the invention adjustment of the mean distance between the lips 17, 18 of the air knife mouth 16 can be achieved by utilising a laterally displaceable wedge member 92. The wedge member 92 is located between and acts upon the upper lip 17 and the body of the air knife 14 such that when the wedge is moved laterally in the directions shown by the arrow 94 the upper lip is caused to move either towards or away from the lower lip 18 in the directions shown by the arrow 96. It should be appreciated that a wedge member 92 may be located to act upon either or both of the lip members 17, 18. In this way the average distance between the lips of the mouth can be modified either independently or in conjunction with the other position options mentioned.

Control over the mean distance between the mouth of the air knife and the surface of the coated sheet, the average air knife gap, and the degree of misalignment between surface of the coated sheet and air knife mouth, either individually or when coupled with the lateral motion of the lips defining the mouth of the air knife, allow all of the major coating defects to be corrected by fine adjustments of the air knife mouth. With this capability the air knife supporting structure can be used to position the air knife in a coarse fashion whilst the fine motion required to accurately control the coating can then be achieved by movement of the air knife mouth alone. This is considered highly desirable when compared to the current practice of attempting to precisely position the entire air knife supporting structure as the components being moved have a far more direct relation to the strip surface being controlled.

It is to be understood that various alterations, modifications and/or additions may be made to the features of the possible and preferred embodiment(s) of the invention as herein described without departing from the spirit and scope of the invention.

What is claimed is:

1. An air knife assembly comprising:

a body adapted to operatively cooperate with a sheet material, the body including an elongate mouth which is defined by a pair of facing lips at least one being moveable relative to the body;

means for distributing a fluid under pressure through the body to enter and emerge from the mouth; and moving means operatively coupled to said lips to effect movement of said lips relative to one another, said movement being in a longitudinal direction relative to the mouth to vary the separation between the lips along at least part of the mouth;

wherein the pressurized fluid emerging from the mouth operates on a coating applied to a surface of the sheet material passing the air knife to control the thickness of the coating.

2. The air knife assembly as claimed in claim 1, wherein each lip of the pair of facing lips has, in front elevation, a curved shape along at least a part of its length, the curved shapes of the lips facing each other.

3. The air knife assembly as claimed in claim 2, wherein the curved shape of each lip is provided along substantially the entire length of the mouth, such that the longitudinal movement of the lips produces a mouth width variation over substantially the entire length of the mouth.

4. The air knife assembly as claimed in claim 2, wherein the shape of each lip is defined by a mathematical function which, taking a mid-point along a length of the mouth as defining an origin of a coordinate system and taking the longitudinal direction and a transverse direction as its axes, defines a shape which is not symmetrical about at least one of the axes, but has anti-symmetry about the two axes.

5. The air knife assembly as claimed in claim 4, wherein the shape of each lip, in-front elevation, is defined by at least one of an odd polynomial function and a trigonometric function.

6. The air knife assembly as claimed in claim 1, wherein the moving means is operable to move both of the lips simultaneously in opposing directions.

7. The air knife assembly as claimed in claim 1, wherein the moving means is operable in response to signals from control means including sensing means operative to sense a coating thickness achieved on a surface of the sheet material.

8. The air knife assembly as claimed in claim 1, wherein the moving means is operable to move the pair of facing lips relative to the body so as to alter a mean distance between the mouth and a surface of the sheet material.

9. The air knife assembly as claimed in claim 1, wherein the moving means is operable to move one end of the pair of facing lips forward relative to the body at one end of the mouth and rearward relative to the body at the other end of the mouth.

10. The air knife assembly as claimed in claim 1, wherein the moving means is operable to longitudinally move a wedge member between one of the lips and the body so as to adjust a position of the lip relative to the other lip and thus an average of a transverse distance between the pair of facing lips along a length of the lips.

11. An air knife mouth arrangement for use in an air knife assembly having a body, the air knife mouth arrangement comprising an elongate mouth which is defined by a pair of facing lips at least one being moveable relative to the body; and moving means operatively coupled to said lips to effect movement of said lips relative to one another, said movement being in a longitudinal direction relative to the mouth to vary a separation between the lips along at least part of the mouth.

12. The air knife mouth arrangement as claimed in claim 11, wherein each lip of the pair of facing lips has, in front elevation, a curved shape along at least a part of its length, the curved shapes of the lips facing each other.

13. The air knife mouth arrangement as claimed in claim 12, wherein the curved shape of each of the lips is provided along substantially an entire length of the mouth, such that the longitudinal movement of the lips produces a mouth width variation over substantially the entire length of the mouth.

14. The air knife mouth arrangement as claimed in claim 12, wherein the shape of each lip is defined by a mathematical function which, taking a mid-point along a length of the mouth as defining an origin of a coordinate system and taking a longitudinal direction and a transverse direction as its axes, defines a shape which is not symmetrical about at least one of the axes, but has anti-symmetry about the two axes.

15. The air knife mouth arrangement as claimed in claim 14, wherein the shape of each lip, in-front elevation, is defined by at least one of an odd polynomial function and a trigonometric function.

* * * * *